UNITED STATES PATENT OFFICE.

DANIEL B. ROGAN, OF NEW ORLEANS, LOUISIANA.

PROCESS FOR CLARIFICATION OF CANE-JUICE.

1,233,919.  Specification of Letters Patent.  Patented July 17, 1917.

No Drawing.  Application filed September 30, 1916.  Serial No. 123,051.

*To all whom it may concern:*

Be it known that I, DANIEL B. ROGAN, a citizen of the United States, residing at New Orleans, in the parish of Orleans and State of Louisiana, have invented certain new and useful Improvements in Processes for Clarification of Cane-Juice; and I do hereby declare the following to be a full, clear, and exact description of the invention, such as will enable others skilled in the art to which it appertains to make and use the same.

My present invention relates to the clarification of sugar juices, sugar-containing liquids, and particularly to juices expressed from sugar cane and the like, to diluted molasses, and other liquids produced in the manufacture of cane sugar. The object of the invention is to remove the invert sugar, ordinarily referred to as dextrose, fructose, and also to remove waxy, gummy and similar impurities, and subsequently to remove albuminous and other nitrogenous materials.

In carrying out my invention I start with the liquid at about ordinary room temperature, such a temperature being preferably below 40° C., although temperatures slightly above this do not cause material injury or loss of sugars.

The liquid is first treated with lime, until the same is alkaline in reaction, after and during which operation, the liquid is agitated in any suitable manner. To the liquid is then added a further quantity of lime in order to bring the alkalinity up to approximately two grams of free lime per gallon, more or less. This liquid, while still at a temperature below about 40° C. is then agitated for a considerable time, by passing a current of air therethrough. The oxygen of the air appears to oxidize some of the constituents, notably the glucose (dextrose) into compounds which unite with lime, under the existing conditions, to produce insoluble compounds. The result of this step is to substantially completely remove the reducing sugars or invert sugar, also the precipitation of gums, waxes, and certain other melassigenic forming substances. During this operation the degree of alkalinity may be varied more or less, but it is preferable to maintain, as above stated, a temperature of approximately 40° C.

When a test shows that the substantially complete removal of the invert sugar has been effected, the cold liquid, still highly alkaline, is sent to the settling tanks, where the precipitate settles and the clear liquid is drawn off, or the liquid may be filtered.

By this operation substantially the entire quantity of glucose, fructose, and other varieties of reducing sugars are removed, leaving a highly clarified and highly pure solution of sugar. All mud, sand, trash, fibers and other similar insoluble materials will be removed by the decantation or filtration, and the removal of certain of the impurities while the liquid is in a cold state, prevents the formation of glucosids, glucosates, saccharates and other caramel-like bodies of a melassigenic character, also removes substances which would tend to darken the sugar and molasses and to retard crystallization and to increase the viscosity of the sugar syrups at later states of the operation. During this operation the bulk of the waxes, resins and gums are also precipitated in the form of insoluble compounds, and thus removed from the liquid.

The liquid is then treated with a gaseous reagent, such as gases containing carbon dioxid or gas containing sulfur dioxid, until the liquid becomes distinctly acid in reaction. If desired, a portion of the treatment may be effected with carbon dioxid, and the remainder with sulfur dioxid. These gases of course will be used in their ordinary commercial diluted condition. The acidity is then brought down, by the addition of lime, until a liquid which is very slightly acid in reaction results. The acidity may be equal to about two grams of $SO_2$ per gallon, although the exact degree of acidity may vary more or less. The liquid up to this time has been maintained at a temperature below 40° C., hence no formation of invert sugar can have been effected in the process, up to this stage, and none of the losses will have occurred, which ordinarily do occur when the liquids are treated at temperatures above 40° C.

The liquid in its slightly acid condition is now heated to boiling, for a short time, or heated to a higher temperature under pressure, until the albuminous matters and the like are precipitated, and the liquid, after filtration, is ready to be sent to the evaporators.

In this final step of heating, it sometimes is inadvisable to heat the juice to as high a point as the boiling point, but a temperature slightly below the boiling point, if maintained for a longer time, is usually sufficient.

The first principle, however appears to be to heat the liquid to not materially below 100° C. at this stage.

In this specification I have referred in numerous places to the use of lime, but I call attention to the fact that other alkaline earth oxids or hydroxids may be employed, also in some instances alkaline earth carbonates, alkaline earth saccharates or similar acting substances. If lime is employed, it may be added dry to the liquid, or may first be slaked and mixed with sufficient water to form a paste or a liquid, which liquid may first be cooled if so desired.

What I claim is:

1. In the purification of sugar-containing liquids, the herein described improvement which comprises (a) adding an alkaline earth metal compound capable of neutralizing acids, until an alkaline reaction is produced in the liquid, while said liquid is at a temperature below about 40° C., (b) adding an excess of such alkaline earth compound, above that required to render the same alkaline in reaction, while still maintaining the temperature below about 40° C., (c) aerating the liquid for an appreciable length of time, while holding the temperature below about 40° C., until the reducing sugars are substantially entirely removed from the liquid, and gummy and waxy materials in the liquid precipitated, (d) treating the liquid with a gaseous acid-forming material until the alkalinity of the liquid is neutralized, while still keeping the liquid at a temperature below 40° C., (e) and thereafter heating to a temperature not materially below 100° C.

2. In the purification of sugar-containing liquids, the herein described improvement which comprises (a) adding an alkaline earth metal compound capable of neutralizing acids, until an alkaline reaction is produced in the liquid, while said liquid is at a temperature below about 40° C., (b) adding an excess of such alkaline earth compound, above that required to render the same alkaline in reaction, while still maintaining the temperature below about 40° C., (c) aerating the liquid for an appreciable length of time, while holding the temperature below about 40° C., until the reducing sugars are substantially entirely removed from the liquid, and gummy and waxy materials in the liquid precipitated, (d) treating the liquid with a gaseous acid-forming material until the alkalinity of the liquid is neutralized, and the liquid rendered acid in reaction, adding more alkaline material to nearly neutralize the acidity of the material and leave the liquid only slightly acid, while still keeping the liquid at a temperature below 40° C., (e) and thereafter heating to a temperature not materially below 100° C.

3. The process of purifying impure sugar solutions which comprises (a) adding an excess of lime to the solutions while at a temperature below 40° C., (b) blowing air through the liquid, while still at a temperature below 40° C., (c) adding an acid to acid reaction, while still at a temperature below 40° C., adding alkali to partial neutralization while still below 40° C., and (d) thereafter heating to about the boiling point.

4. The process of purifying sugar solutions which comprises (a) treating with alkaline earth material in excess, (b) aerating and mixing, (c) gassing to acid reaction, (d) and partially neutralizing, all of said steps being performed at a temperature below 40° C., and thereafter heating to a temperature of near 100° C.

In testimony whereof, I affix my signature.

DANIEL B. ROGAN.